US006433495B1

(12) United States Patent
Wiberg

(10) Patent No.: US 6,433,495 B1
(45) Date of Patent: Aug. 13, 2002

(54) DEVICE FOR FITTING OF A TARGET IN ISOTOPE PRODUCTION

(75) Inventor: Peter Wiberg, Bälinge (SE)

(73) Assignee: Gems Pet Systems AB, Uppsala (SE)

( * ) Notice: Subject to any disclaimer, the term of this patent is extended or adjusted under 35 U.S.C. 154(b) by 0 days.

(21) Appl. No.: 09/787,802

(22) PCT Filed: Sep. 23, 1999

(86) PCT No.: PCT/SE99/01661

§ 371 (c)(1),
(2), (4) Date: May 4, 2001

(87) PCT Pub. No.: WO00/19787

PCT Pub. Date: Apr. 6, 2000

(30) Foreign Application Priority Data

Sep. 29, 1998 (SE) .............................................. 9803302

(51) Int. Cl.$^{7}$ .......................... H05H 13/00; G01K 1/08
(52) U.S. Cl. ....................................... 315/502; 250/398
(58) Field of Search ................................ 315/500, 501, 315/502; 250/489, 398, 505.1, 432 R; 376/202, 112; H05H 13/00; G01K 1/08

(56) References Cited

U.S. PATENT DOCUMENTS

| | | | | | |
|---|---|---|---|---|---|
| 4,157,471 | A | * | 6/1979 | Mlekodaj | 250/423 R |
| 4,464,331 | A | * | 8/1984 | Bezer et al. | 376/202 |
| 4,529,571 | A | * | 7/1985 | Bacon et al. | 376/144 |
| 4,800,060 | A | | 1/1989 | Goldring | 376/202 |
| 4,943,781 | A | * | 7/1990 | Wilson et al. | 328/234 |
| 4,945,251 | A | | 7/1990 | Bechtold et al. | 250/492.1 |
| 5,280,505 | A | * | 1/1994 | Hughey et al. | 376/156 |
| 5,340,983 | A | * | 8/1994 | Deinzer et al. | 250/281 |
| 5,485,016 | A | * | 1/1996 | Irie et al. | 250/288 |
| 5,586,153 | A | * | 12/1996 | Alvord | 376/196 |

* cited by examiner

*Primary Examiner*—Don Wong
*Assistant Examiner*—Trinh Vo Dinh
(74) *Attorney, Agent, or Firm*—Birch, Stewart, Kolasch & Birch, LLP

(57) ABSTRACT

A device is disclosed for simple and quick disconnection of a target assembly at a cyclotron accelerator producing an ion beam irradiating the target assembly for PET radioisotope production. The device consists of a target body presenting a target space for introduction of target media to be irradiated by the ion beam from the cyclotron accelerator. The target body is separated into three portions by means of two separation window foils. The first separation window separates the internal space of a first body portion from a further internal space portion of a second target body portion and the second separation window separates a further internal space of the second target body portion from an internal space of a third target body portion being in communication with the vacuum space of the cyclotron. This third body portion forms a bayonet fitting to a corresponding bayonet fitting fixed to the cyclotron vacuum casing at a position where the ion beam is extracted, whereby the corresponding bayonet fitting also constitutes an insulating member. The device can by a small twisting be quickly released from the vacuum casing of the cyclotron after the vacuum has been removed for necessary maintenance and service.

8 Claims, 3 Drawing Sheets

DEVICE FOR FITTING OF A TARGET IN ISOTOPE PRODUCTION

This application is the national phase under 35 U.S.C. § 371 of PCT International Application No. PCT/SE99/01661 which has an International filing date of Sep. 23, 1999, which designated the United States of America and was published in English.

TECHNICAL FIELD

The present invention relates to a device for quick fitting and insulation of a target for radioisotope production

BACKGROUND OF THE INVENTION

An isotope production system is a complex system with several subsystems and functions. Such a system produces radioactive tracers, which means that the system has to be in harmony with a number of regulations for such activities, particularly regarding radiation hazards.

Production of radio-isotopes takes place in so called "targets" which are mounted either directly onto a suitable particle accelerator, normally a cyclotron or on an ion beam transfer line extension from the accelerator.

Targets also need regular maintenance. Time between services depends on operation time, beam current level, type of target, etc. Sudden failures, such as target window ruptures, may also occur. A target window normally constitutes a thin foil of the order 10–25 μm made of, for instance, titanium or an alloy having the corresponding characteristics. Such thin window foils are used to separate a target media space in the target body from the vacuum space of the cyclotron.

The target body will get heated from the irradiation by the ion beam, and therefore has to be cooled. At all instances the user would like to commence their research and clinical program without loosing time. To wait too long for a radioactive target to cool down is not a realistic scenario. A faulty target is desired to be replaced immediately. Therefore, the elapsed time for removal of a target is of great importance, besides to limit the dose exposure to maintenance staff, but the logistics related to the maintenance actions and the design of the target itself are also important.

This implies that mechanical problems arise as the target has to be fixed to, but also releasable from, the vacuum system of an ion beam accelerator system or its ion beam transfer extension line. In the case of an accelerator system there is also a need for a radiation shield, to be able to house the device in a proper environment regarding radiation hazards, which means that normally a lot of restricted space must be reserved. The GE MINItrace, for instance, discloses an integrated device adopted for localised production of short-lived PET (Positron Emission Tomography) isotopes for medical diagnostics for instance at a local hospital. Generally there is then a desire that an operator of the isotope production system should be able to keep a maximum distance to a target which has to be removed during the operation of the facility.

SHORT DESCRIPTION OF THE INVENTION

The present invention discloses a target connection and insulation having a quick fitting to a small cyclotron housed in an integrated radiation shield. The target will be easily accessed after opening one of the radiation-shielding doors of the shield and the target device can then be manipulated while still minimising radiation hazards for the operator of the PET isotope production facility.

A device according to the present invention is set forth by the independent claim 1 and further embodiments of the device are defined by the dependent claims.

SHORT DESCRIPTION OF THE DRAWINGS

The objects, features and advantages of the present invention as mentioned above will become apparent from the description of the invention in conjunction with the following drawings, in which same or equal elements will be denoted by the same numerals, and wherein.

DESCRIPTION OF AN ILLUSTRATIVE EMBODIMENT

Figure 1:
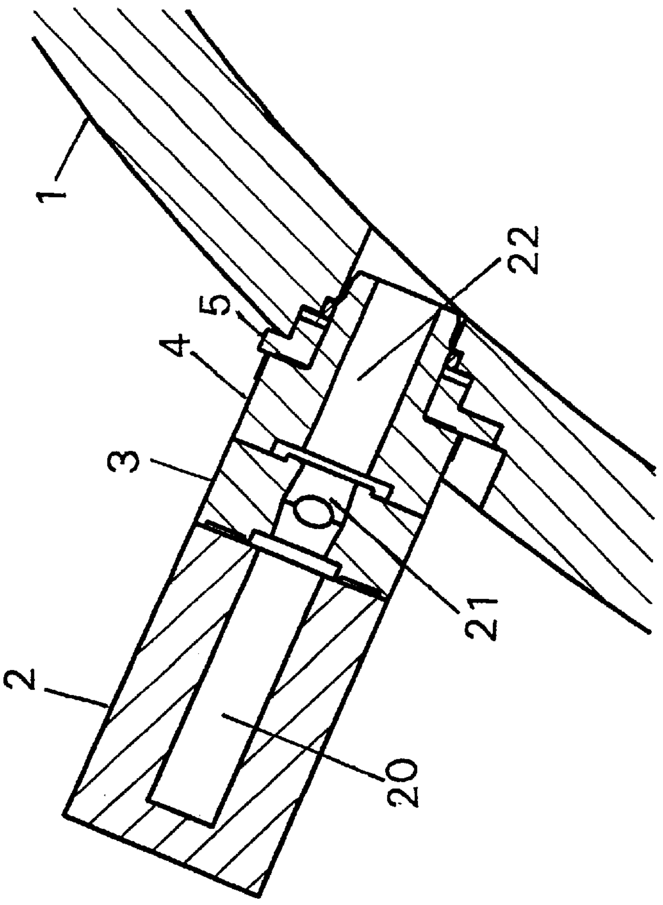
FIG. 1 is a cross section of an embodiment of a target arrangement according to the present invention.
Figure 2:
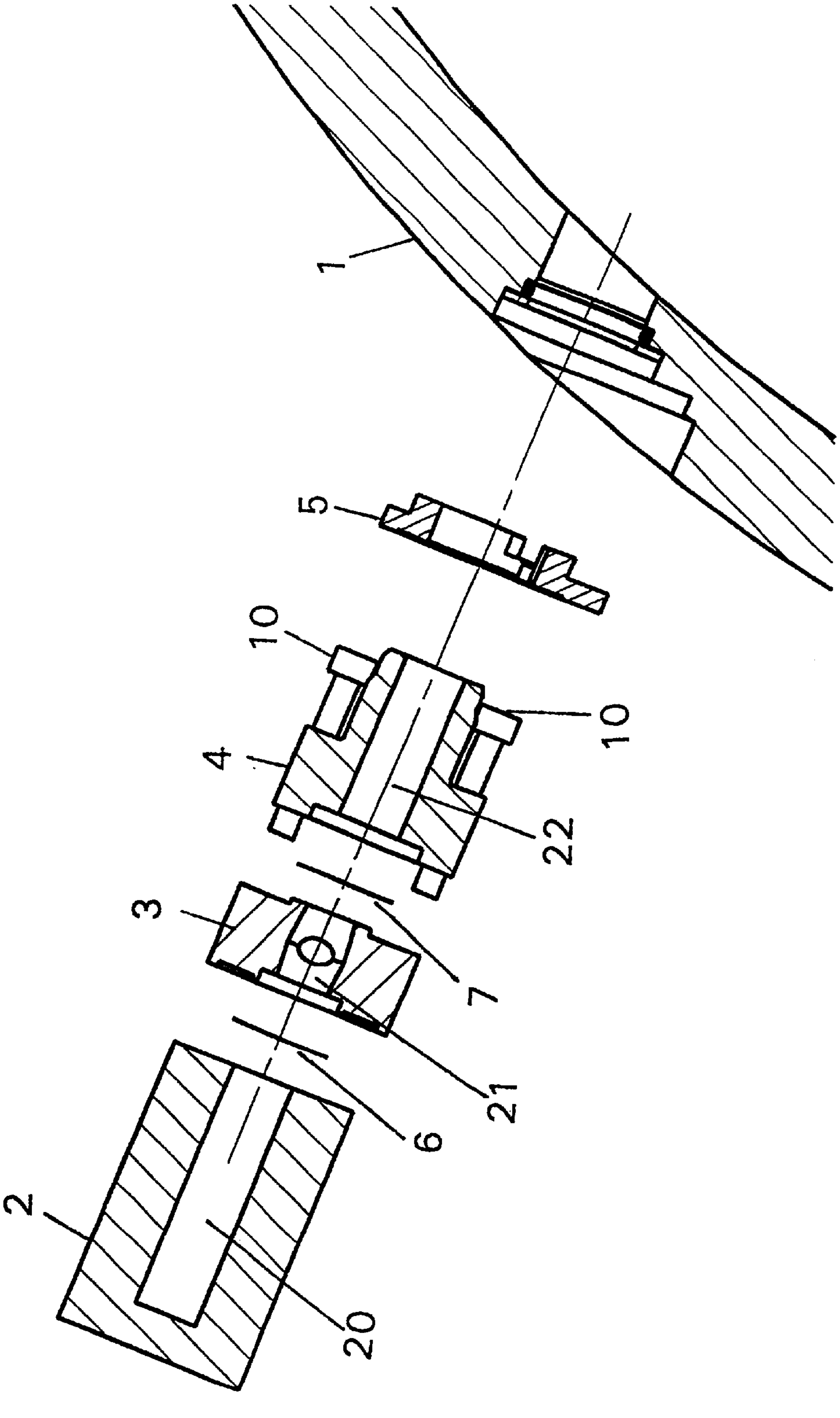
FIG. 2 is a cross section of the disassembled target arrangement according to FIG. 1.
Figure 3:
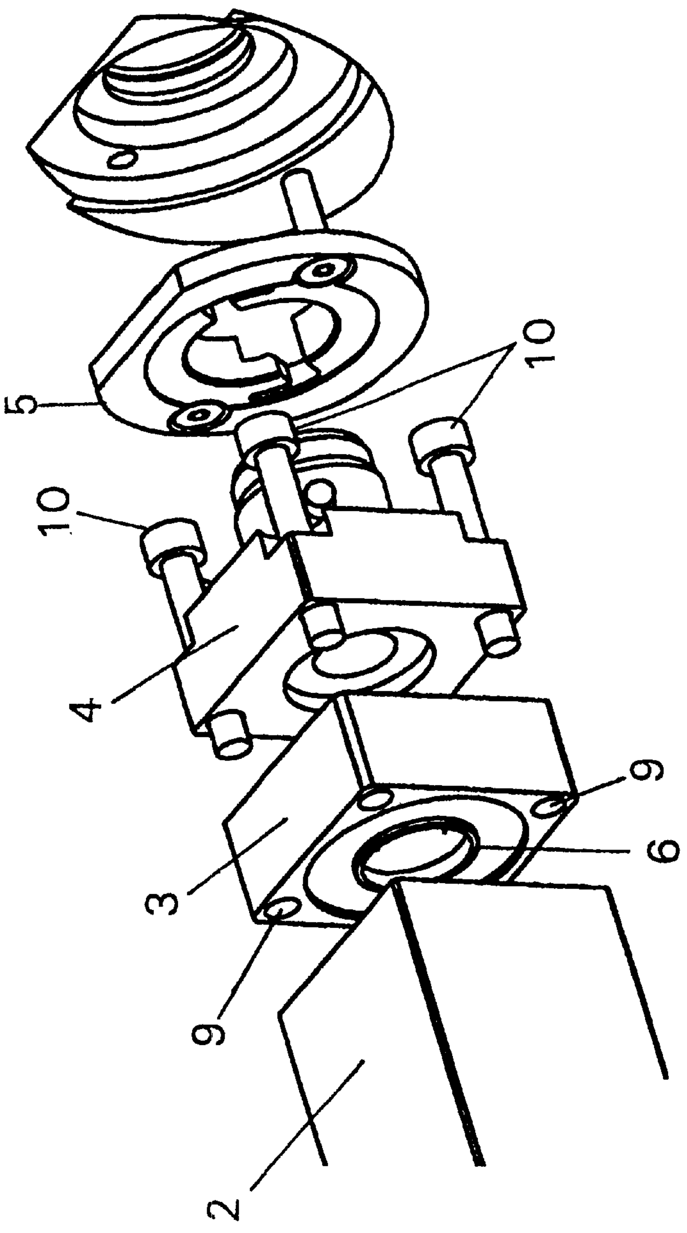
FIG. 3 is a three-dimensional view of the disassembled target arrangement according to FIG. 2.

In FIGS. 1 to 3 a preferred embodiment of a target arrangement is demonstrated for the production of PET radioisotopes by means of a small cyclotron designed particularly for acceleration negative hydrogen ions. Radioactive isotopes are formed via nuclear reactions between bombarding high-energy ions and a target medium, which can be a pressurised gas, a liquid or a solid.

In the preferred target device two thin window foils separate the vacuum of the accelerator from the target medium. Both windows have to be penetrated by the ion beam before the nuclear reaction takes place in a target media chamber 20. In FIG. 1 is shown a target body containing a target section 2, an intermediate cooling section 3 and an adapter section 4 fitting an adapter receive portion 5 mounted directly onto a cyclotron vacuum casing 1. The intermediate section 3 between the two windows 6 and 7 is in the preferred embodiment filled with circulating inert gas (normally helium)providing window cooling. The target portion 2 also requires cooling during irradiation and is therefore in the preferred embodiment provided with connections for the provision of cooling water to target portion 2 and likewise there is a connection for helium cooling to intermediate section 3. In order to speed up removal of the target body these connections (not shown) are using standardised type self closing quick connections well known to a person skilled in the art and therefore not further discussed in this context.

The target device with its separation windows forms one integral body by means of, in the preferred embodiment, four of bolts 10 passing through the second target body portion and tightening the second target body portion 3 carrying the two separation window foils 6 and 7 between the first body portion 2 and the third body portion 4. In the illustrated embodiment bolts 10 are threaded into the first body portion 2 to interfere as little as possible with available cooling channels in the first body portion 2. The bolts 10 then are fed via through holes 9 shaped in the body portion 3 and similarly in the portion 4. In another embodiment the bolts 10 may be facing the other direction as well with through holes in the first portion 2 and threads in the third portion 4.

The target device, according to the preferred embodiment, is electrically insulated from the cyclotron structure 1 particularly for enabling a measurement of an electrical current from the beam of ions hitting the target body.

The target portion 2, which forms the space 20 for target media, will easily be contaminated by radioactive isotopes created due to the irradiation by the ion beam, and in particular the target windows 6 and 7 may be very radioactive due to the interaction of the window material with the ion beam passing through those. It is therefore imperative that removal of an irradiated target device has to be as fast as possible in order to limit the dose load to personnel performing such a task. The time of removal is primarily determined by the design of the target fixation system and to some extent by connections for the target cooling fluids as well as connections for target media.

The target body, consisting of the assembled portions 2, 3, and 4, is held in place in operation by a fixation mechanism 4 and 5 obtaining some additional force which will be created by the pressure difference between the external atmospheric pressure and the cyclotron vacuum.

The fixation of the target assembly to the cyclotron 1 is obtained by a specially designed bayonet fitting 4, 5 whereby the removal of a target body will be done by a simple small twist, which will take not even a second. To grip the target body the use of a particular pliers tool is supposed to be used, preferably with a latching function (not shown) in order to add distance from an operator's hand to the target body. Furthermore, the removal is then easily done as a "one hand operation" with a fully stretched arm keeping the target body, consisting of the assembled portions 2, 3, 4, far away from the operator's body. (In this context it may be noted that regulations regarding radioactive dose exposure to personnel allows ten time higher finger doses compared to body doses.)

Portion 5 of the bayonet attaching device fixed to the vacuum casing of the cyclotron according to a preferred embodiment is made of a material which, except for the desired vacuum sealing, provides some lubrication (for the twisting). This is solved by making the material of the bayonet portion 5 in contact with the portion 4 of an insulating material, like a plastic material, thus providing the necessary lubrication as well as target insulation in the same component. For the desired vacuum sealing a high precision of the two portions 4 and 5 is necessary and also for the insulating O-ring sealing.

A complete disassembly of the target body according to the illustrative embodiment of the target body will only involve loosening of the four bolts 10. As already mentioned, the target foil windows 6 and 7 are the dominant sources of radioactive radiation. The present design of the target body then makes the removal step of these window foils to a quick and uncomplicated operation, which will also promote a lower dose exposure to the operator staff.

A lead container ("lead pig") for transport of the target body to a service area will be an effective way of handling the removed target body. A table top lead shield with a lead sight glass with provisions for fixation of the target body is the preferred assisting device recommended. The disassembly of the target body then takes place in the table top shield.

The following steps describes the operation procedure for target body removal and disassembly after that the isotope production operation has been ceased and the cyclotron vacuum released: First step will be to open up the cyclotron radiation shield for accessing the target to be removed. In the case of the suggested accelerator device a GE MINItrace device it only means opening a heavy front radiation shielding access door, which at the same time normally should break all electrical circuitry present (to prohibit operation of the cyclotron). When breaking the electrical circuits all pumping of coolants and target media will of course be interrupted. No further vacuum pumping will be performed and a by means of a suitable valve the vacuum of the cyclotron casing will then be released.

Next step is disconnection of water and/or helium cooling connections of the target body portions 2 and 3 as well as connections to the target portion 2 for target media (hand exposure for 1–2 seconds).

Then a target body removal tool (not shown) is introduced, gripping the target body and by twisting the removal tool slightly the target is then quickly be released from the cyclotron vacuum casing 1. Still with the removal tool attached the entire target body consisting of the portions 2, 3 and 4 is deposited into a lead shield container (hand exposure for 2–3 seconds).

With the target in the lead shield container it will be moved to a service area (no exposure) after which the target body is moved from the lead container to a particularly adapted radiation shielded target body service and fixing position (hand exposure for 2–3 seconds), where the target can then be disassembled (immediately or after any specified time period) by removing the four screws 10 connecting the target portions 2, 3 and 4 together and forming the target body. When these screws or bolts 10 are removed the foil windows 6 and 7 will be accessed (hand exposure for 10–15 seconds but at a lower average dose level). The foil windows 6 and 7, as already mentioned are the most critical parts regarding radiation hazards and should therefore be kept at a largest possible distance form the hands. It is recommended to have a local small lead container especially intended for accommodating the foils. A long tweezers for moving the foils to the lead container is then strongly recommended.

With window foils removed the target body components can still be expected to be radioactive but at a much lower level making the further handling more uncritical.

Consequently the device according to the present invention makes it possible to handle an irradiated target body with a lowest possible radiation dose to the operator. Particularly the simple disconnection operation from the cyclotron vacuum casing improves the handling safety in the delicate operation of a PET isotope production facility for diagnostic tracers.

It will be understood by those skilled in the art that various modifications and changes may be made to the present invention without departing from the spirit and scope thereof, which is defined by the appended claims.

What is claimed is:

1. A device for quick connection of a target arrangement for radioisotope production to a cyclotron accelerator producing an ion beam for irradiating said target, comprising:

a target body consisting of a first target body portion, a second target body portion and a third target body portion, the first target body portion presenting a first target space for introduction of a target medium to be irradiated by the ion beam from the cyclotron accelerator, a first separation window separating the first target space in the first target body portion from a second internal space portion in the second target body portion, a second separation window separating the second internal space in the second target body portion from a third internal space in the third target body portion being in communication with the vacuum space of the cyclotron, the third body portion forming a bayonet fitting fixable to a corresponding bayonet fitting, which is fixed to the cyclotron vacuum casing at a position for extracting the ion beam, whereby the corresponding bayonet fitting also constitutes an insulating member.

2. The device according to claim 1, wherein the target device with its separation windows forms one integral body by means of a number of bolts passing through the second target body portion and tightening the second target body portion between the first and third body portions.

3. The device according to claim 2, wherein the bayonet fitting of the third body portion constitutes a male portion and the corresponding bayonet fitting constitutes a female portion.

4. The device according to claim 2, wherein the bayonet fitting of the third body portion constitutes a female portion and the corresponding bayonet fitting constitutes a male portion.

5. The device according to claim 2, wherein the first target body portion is provided with connections for a cooling fluid being for instance circulating water.

6. The device according to claim 5, wherein the first target body portion is further provided with connections for supply and discharge of a target medium.

7. The device according to claim 2, wherein the second target body portion is provided with connections for circulation of a cooling fluid, such as an inert gas, for cooling the first and second separation windows.

8. The device according to any one of the claims 5 to 7, wherein the connections for cooling fluids are of a quick connection type for particularly speeding up disconnection.

* * * * *